Aug. 20, 1929.  A. W. MATTHEWS ET AL  1,724,950
WELT TREATING MACHINE
Filed Aug. 5, 1925

INVENTORS.
Algernon W. Matthews
Joseph F. Williams
By their Attorney
Nelson W. Howard Patented Aug. 20, 1929.

1,724,950

UNITED STATES PATENT OFFICE.

ALGERNON W. MATTHEWS AND JOSEPH FRANKLIN WILLIAMS, OF HAVERHILL, MASSACHUSETTS, ASSIGNORS TO UNITED SHOE MACHINERY CORPORATION, OF PATERSON, NEW JERSEY, A CORPORATION OF NEW JERSEY.

WELT-TREATING MACHINE.

Application filed August 5, 1925. Serial No. 48,396.

This invention relates to an improved machine and method of treating welts and is illustrated herein as embodied in a machine for beating the bead of a storm welt.

In some shoes, a particular type of welting commonly called storm welting provides in the finished shoe an upstanding bead outside of and adjacent to the upper, the purpose of which is to render the inseam of the shoe more nearly impervious to water and to improve the general appearance of the shoe. This bead, which is formed from a flap of the welting, naturally assumes a rounded form and in the manufacture of the shoe it is found that frequently the bead does not lie close to the upper but gaps leaving unsightly, irregular spaces, thus more or less defeating its purpose.

With this in view, it is an object of this invention to provide a machine for practising a novel method of beating the bead of a storm welt to cause it to lie close to the upper and to improve the appearance of the shoe by providing a flat outer surface on the bead.

In the attainment of this object the present invention provides an improved welt beating machine comprising, as herein illustrated, a work table upon which the tread surface of the sole of a shoe is supported and a thin, blunt-ended tool mounted for rectilinear movement in a direction substantially parallel to the surface of the work table. Also means are provided for positively imparting rapid percussional impulses to the tool so that under the action of the latter the bead of the welt is laid close to the upper and a flat outer surface is formed upon its lateral face.

An important feature of the invention resides in a novel method which the illustrated embodiment of the invention is adapted to practice. This method of laying the bead of a storm welt consists in applying pressure progressively from the upper to the lower edge of the bead, each application of pressure constituting one of a series performed progressively in the direction of the length of the welt.

One embodiment of the invention is described in the following specification, reference being made to the accompanying drawings, in which.

Figure 1:
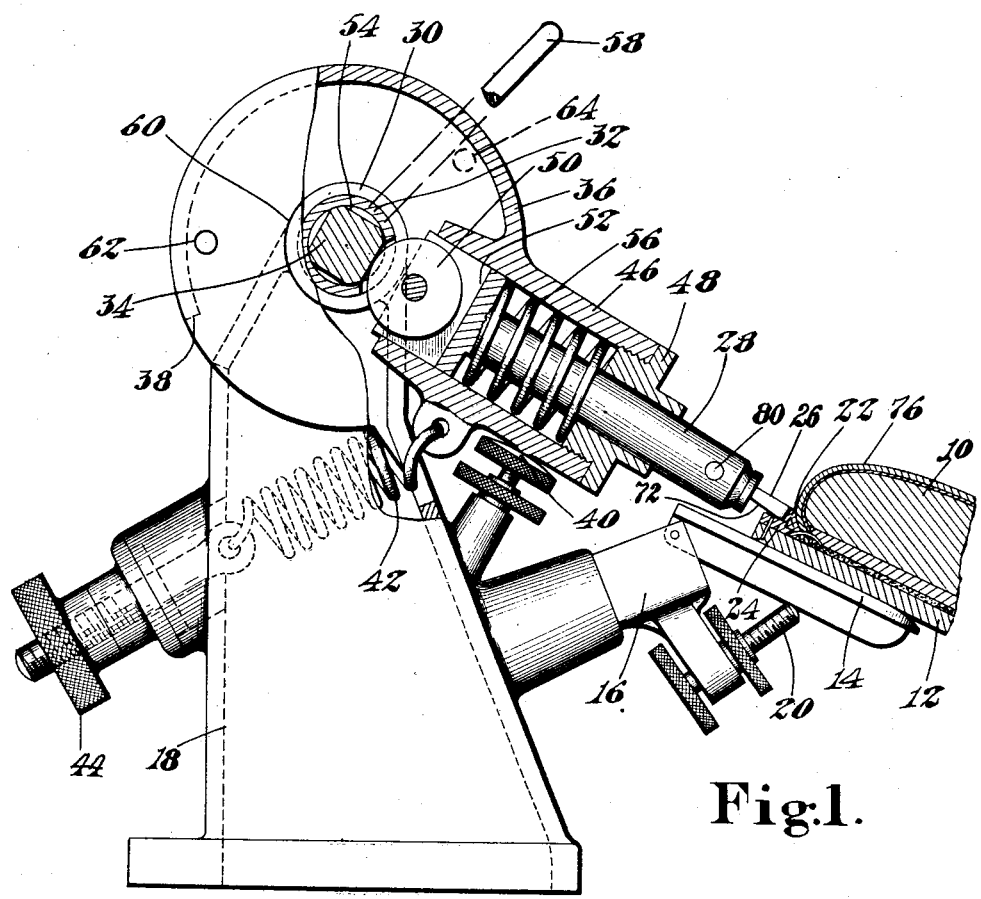
Fig. 1 is a side view of the machine with parts in section.
Figure 2:
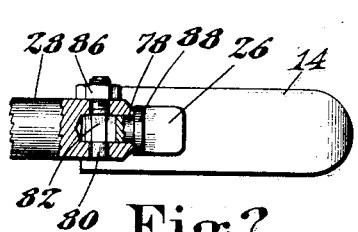
Fig. 2 is a plan view of the work-supporting table and the tool, the tool support being broken away.

Preferably the work to be treated will be presented to the machine while mounted upon a last 10, and the tread surface of the sole 12 of the shoe rested upon a narrow, angularly adjustable, work-supporting table 14. This table 14 is pivoted to an outwardly projecting stud 16 secured in a boss upon the frame 18 of the machine, and an adjusting screw 20 is provided for determining the angular relation of the work-supporting table with respect to the machine. The work will be held by the operator with the outer face of an upwardly extending bead 22 of a storm welt 24 in contact with the smooth, flat, outer end of a tool 26. This tool is held in the end of a plunger 28 and means, to be described, are provided for positively imparting rapid percussional impulses and to cause the flat end of the tool to beat against the lateral or vertical face of the upstanding bead 22 of the welt.

For this purpose the frame of the machine is provided with spaced bearings (one of which is illustrated at 30) in which is mounted a bushing 32, a power-operated shaft 34 being rotatably mounted within said bushing. A casing 36 has an enlarged central portion which is cut away at 38 to allow it to be positioned over the upper end of the frame 18 and is provided with end bearings so that it may be rotatably mounted upon the ends of the bushing 32 surrounding the shaft of the machine. An adjustable stop 40 is provided to limit the movement of the casing in one direction and the casing is held against this stop by means of a spring 42 the tension of which may be adjusted by means of a nut 44. The casing 36 is provided with an outwardly projecting barrel 46 in which is slidably mounted the plunger 28. A plug 48 bored to provide a guiding bearing for the outer end of the plunger 28 closes the end of the barrel 46 and a wheel 50 pivoted in a slot 52 formed in the inner end of the plunger 28 is arranged to bear against flats or cam faces 54 provided near the central portion of the power-operated shaft 34. The particular shape and number of cam surfaces formed upon the shaft will depend upon the character of the work to be performed. A compression spring 56 is interposed between the plug 48 and the head of the plunger 28 which holds the wheel 50 against the cam surfaces 54. As may be seen in Fig. 1, the bushing 32 is partly cut away near its central portion in order to allow the wheel 50 to bear against the cam surfaces 54. A handle 58 is provided, however, which extends through a cap 60 mounted outside of the casing 36 and secures this cap to the bushing and provides means for rotating the bushing to bring an uninterrupted part thereof between the cam surfaces of the shaft and the wheel 50. Studs 62 and 64 may be provided upon the casing to limit the movement of the handle 58. This arrangement affords means for interrupting the action of the tool without stopping the drive shaft.

Figure 3:
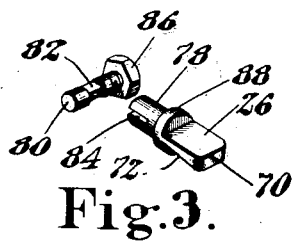
Fig. 3 is an exploded view of the tool and its securing means.
Figure 4:
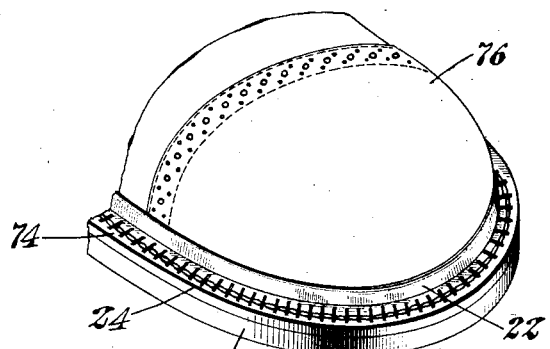
Fig. 4 is a perspective view of the toe of a shoe in which the bead of the storm welt has been laid against the upper.

As may be seen from an inspection of Fig. 3, the tool 26 is provided with a flat outer end 70 having rounded corners, to prevent damage to the work, and is cut away slightly at 72 to assist the operator in avoiding damage to the stitches or the upper surface 74 of the welt 24. The active end 70 is inclined slightly to the axis of the tool so that the upper edge tends to exert greater pressure on the bead of the welt. Furthermore, it will be appreciated that shaping the tool in this manner results in pressure being applied first to the top edge of the bead and then progressively downwards in the direction of the lower edge thereof. By reason of the narrow heightwise extent of the active end face 70 of the tool which heightwise extent is small in proportion to the width of said face 70 and corresponds to the height of the bead of the storm welt, no damage will be done to an upper 76 in the operation of the machine. The tool is provided with a slotted shank 78 adapted to be received in the socket at the outer end of the plunger 28 and is held therein by means of a bolt 80 having a flattened reduced portion 82 which is received within a slot 84 in the shank 78 of the tool and may be drawn laterally, to bind the shank within the plunger, by means of a nut 86. An enlarged portion or flange 88 between the thin forwardly projecting portion of the tool and the shank 78 serves as an abutment to assist the operator in locating the tool in the end of the plunger.

In operating the machine the user will first adjust the tilt of the table 14 by means of the screw 20 and the height of the barrel 46 by means of the stop 40 to suit the particular work at hand, the object being to bring the flattened end 70 of the tool 26 against the outer upstanding face of the bead 22 of the welt without contacting with the upper stitched surface 24 of the welt. Then as the machine is set in motion either by the proper manipulation of the handle 58 or by applying power to the shaft 34, if this has not already been done, a series of rapid percussional impulses will be imparted to the tool to lay the upstanding bead 22 closely against the upper 76. Concurrently, the shoe is fed relatively to the tool 70 to cause the impulses to progress around the shoe in the direction of the length of the welt. It will also be remembered that each of these impulses is applied first to the top edge of the bead and then progressively downwards in the direction of the bottom edge thereof. This makes the welt more effective in excluding water and greatly improves the appearance of the shoe by preventing gaps between the bead of the welt and the upper and also by forming a flattened outer face upon the upstanding bead which is uniform around the shoe.

Having described the invention, what we claim as new and desire to secure by Letters Patent of the United States is:—

1. In a machine for treating shoes having storm welts, the combination of means for supporting the sole of a shoe, a tool having an acting face adapted to engage a storm welt below the exposed face of the upper and force it toward the upper of the shoe, and means for operating the tool.

2. In a machine for treating shoes having storm welts, the combination of means for supporting the sole of a shoe, a beating tool having an acting face adapted to engage a storm welt below the upper of the shoe, and means for imparting rapid percussional impulses to the tool in a direction to force the bead of the storm welt toward the upper of the shoe.

3. In a machine for treating shoes having storm welts, the combination of means for supporting the sole of a shoe, a tool having an acting face the extent of which heightwise of the shoe corresponds substantially to the height of the bead of the storm welt, and means for imparting rapid movements to the tool in a plane substantially parallel to the plane of the shoe bottom to force the bead of the welt toward the upper.

4. In a machine for treating shoes having storm welts, the combination of means for supporting the sole of a shoe, a tool having an acting face extending heightwise of the shoe substantially perpendicular to the plane of the sole and corresponding in height to the bead of the storm welt, and means for imparting rapid percussional impulses to the tool to force the inner face of the bead tight against the upper.

5. In a machine for treating shoes having storm welts, means for supporting a shoe by engagement with the tread surface of the sole thereof, a tool having a face adapted to engage the storm welt of the shoe, means for supporting said tool for rectilinear movement in a path substantially parallel to the surface of the shoe supporting means, and means for positively imparting rapid percussional impulses to the tool to lay the bead of the storm welt against the upper of the shoe.

6. In a machine for treating shoes having storm welts, means for supporting a shoe, a blunt-ended tool adapted to engage the storm welt of the shoe, means for supporting said tool for movement in a path substantially parallel to the surface of the shoe supporting means, and means for operating the tool through said path to force the storm welt toward the upper of the shoe.

7. In a machine of the character described, a work support, means adapted to engage the tread face of the sole of a shoe having a beaded welt to be treated by the machine, means for adjusting the angular position of said work support, a thin blunt-ended tool having a smooth work-engaging end with rounded corners, means for supporting said tool for movement in a path slightly inclined downwardly toward the outer end of the work support so that it may engage the bead of a welt while avoiding the stitching, and means for imparting rapid percussional impulses to said tool through its supporting means to lay the bead of the welt against the upper of the shoe.

8. In a machine of the character described, a welt-beating tool having a shank portion and a blunt, thin work-engaging end portion, the under surface of part of said tool adjacent to said end being relieved to avoid damaging engagement of said surface with parts of the work not being treated by the end of the tool.

9. In a machine for treating shoes having storm welts, a thin, blunt-ended welt-beating tool having a smooth work-engaging end with rounded corners.

10. In a machine for treating shoes having storm welts, a thin blunt-ended tool, the vertical face at the end of said tool being inclined slightly forward so that the upper edge of the tool exerts a greater pressure on the upper edge of the bead of the storm welt than is exerted upon the lower edge thereof.

11. In a machine of the character described, a frame, a work-supporting table pivotally mounted upon said frame, means for adjusting the angular position of said table, a tool-carrying plunger, means for supporting and guiding said plunger for movement toward and away from the work, means for adjusting the angular relation of said supporting and guiding means to vary the angular relation of the path of movement of the plunger with respect to the surface of the work-supporting table and the separation of the outer end of the plunger from the table, a thin blunt-ended tool carried by said plunger, and means for imparting rapid percussional impulses to the tool through the plunger.

12. In a machine of the character described, a work support adapted for engagement with the tread face of the sole of a shoe to be treated in the machine, a thin blunt-ended tool for engagement with the bead of a welt on the shoe, means for supporting said tool for movement toward and away from said bead, and means for imparting rapid percussional impulses to the tool applied in a direct line passing through the tool and its supporting means.

13. The method of laying the bead of a storm welt against the upper of a shoe which consists in applying pressure progressively from the upper to the lower edge of the bead, each application of pressure constituting one of a series performed progressively in the direction of the length of the welt.

In testimony whereof we have signed our names to this specification.

ALGERNON W. MATTHEWS.
JOSEPH FRANKLIN WILLIAMS.